US011820344B2

(12) United States Patent
Hines

(10) Patent No.: US 11,820,344 B2
(45) Date of Patent: Nov. 21, 2023

(54) SYSTEM TO MONITOR AND PREDICT VEHICLE BRAKE WEAR AND RELATED METHODS

(71) Applicant: Tony Hines, Tampa, FL (US)

(72) Inventor: Tony Hines, Tampa, FL (US)

(*) Notice: Subject to any disclaimer, the term of this patent is extended or adjusted under 35 U.S.C. 154(b) by 587 days.

(21) Appl. No.: 17/085,530

(22) Filed: Oct. 30, 2020

(65) Prior Publication Data

US 2021/0129822 A1 May 6, 2021

Related U.S. Application Data

(60) Provisional application No. 62/929,247, filed on Nov. 1, 2019.

(51) Int. Cl.
| | |
|---|---|
| *B60T 17/22* | (2006.01) |
| *G01S 19/52* | (2010.01) |
| *G01D 5/14* | (2006.01) |
| *G01D 5/26* | (2006.01) |
| *G01P 15/00* | (2006.01) |

(Continued)

(52) U.S. Cl.
CPC .......... *B60T 17/221* (2013.01); *F16D 66/027* (2013.01); *G01B 11/14* (2013.01); *G01D 5/145* (2013.01); *G01D 5/26* (2013.01); *G01P 15/00* (2013.01); *G01S 19/52* (2013.01); *G06K 7/1413* (2013.01); *G06K 19/06028* (2013.01); *G06T 11/00* (2013.01); *B60T 2210/36* (2013.01); *B60T 2220/04* (2013.01); *B60T 2250/04* (2013.01); *F16D 2066/006* (2013.01); *H04W 84/12* (2013.01)

(58) Field of Classification Search
CPC ............... B60T 17/221; B60T 2210/36; B60T 2220/04; B60T 2250/04; B60T 7/042; F16D 66/027; F16D 2066/006; G01B 11/14; G01B 11/026; G01D 5/145; G01D 5/26; G01P 15/00; G01S 19/52; G06K 7/1413; G06K 19/06028; G06T 11/00; H04W 84/12
See application file for complete search history.

(56) References Cited

U.S. PATENT DOCUMENTS

| 4,964,679 A | 10/1990 | Rath |
| 5,892,437 A | 4/1999 | Scheibe et al. |

(Continued)

FOREIGN PATENT DOCUMENTS

CN 103167977 11/2015

*Primary Examiner* — Yuen Wong
(74) *Attorney, Agent, or Firm* — ALLEN, DYER ET AL.

(57) ABSTRACT

A system to monitor and predict vehicle brake wear includes a brake sensor configured to be coupled to a brake pedal of a vehicle and to transmit data of the brake pedal operation of when the brake pedal is pressed and a duration, and an electronic control unit (ECU) is coupled to the brake sensor. The ECU includes a microprocessor coupled to a memory, where the microprocessor is configured to receive data of the brake pedal operation, and to calculate a depth of wear of a brake component based on the brake pedal operation. The ECU also comprises a global positioning system configured to determine a speed of the vehicle, and an accelerometer. In addition, the ECU includes a module configured to transmit data from the ECU to a remote computer, where the remote computer is configured to receive the data from the ECU and to generate a virtual map.

15 Claims, 6 Drawing Sheets

(51) Int. Cl.
    *G01B 11/14*     (2006.01)
    *G06T 11/00*     (2006.01)
    *G06K 7/14*     (2006.01)
    *G06K 19/06*     (2006.01)
    *F16D 66/02*     (2006.01)
    *H04W 84/12*     (2009.01)
    *F16D 66/00*     (2006.01)

(56) References Cited

U.S. PATENT DOCUMENTS

| | | |
|---|---|---|
| 7,373,224 B2 | 5/2008 | Goetz et al. |
| 2016/0163130 A1 | 6/2016 | Zagajac et al. |
| 2017/0120884 A1 | 5/2017 | Mate et al. |
| 2018/0134161 A1 | 5/2018 | Gaither et al. |
| 2019/0225202 A1* | 7/2019 | Juzswik .................. B60T 8/34 |
| 2019/0234475 A1 | 8/2019 | Hall |

\* cited by examiner

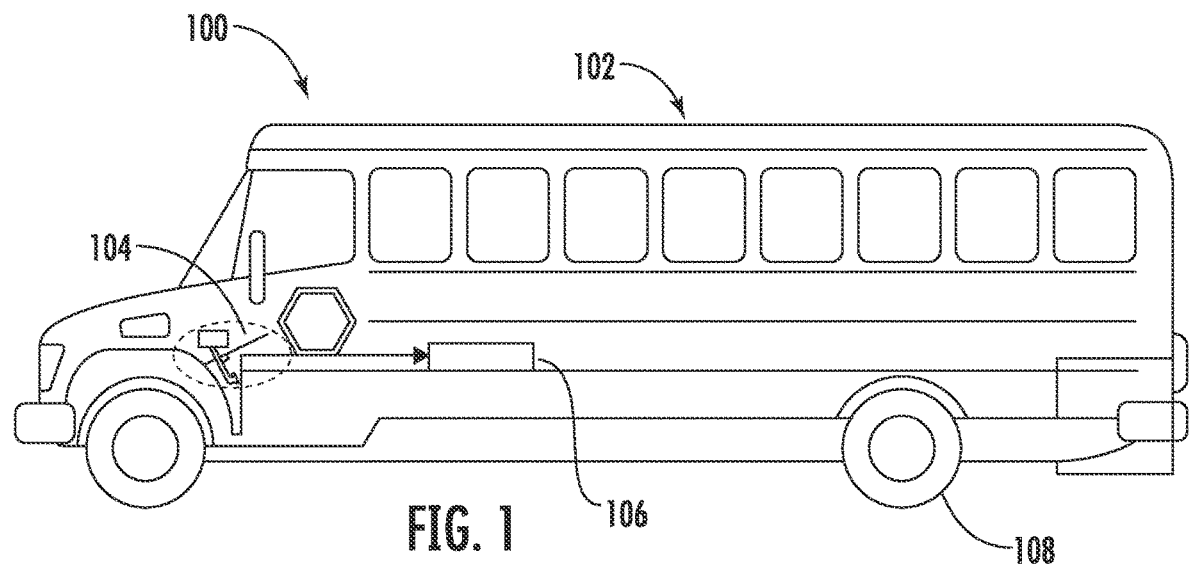
FIG. 1
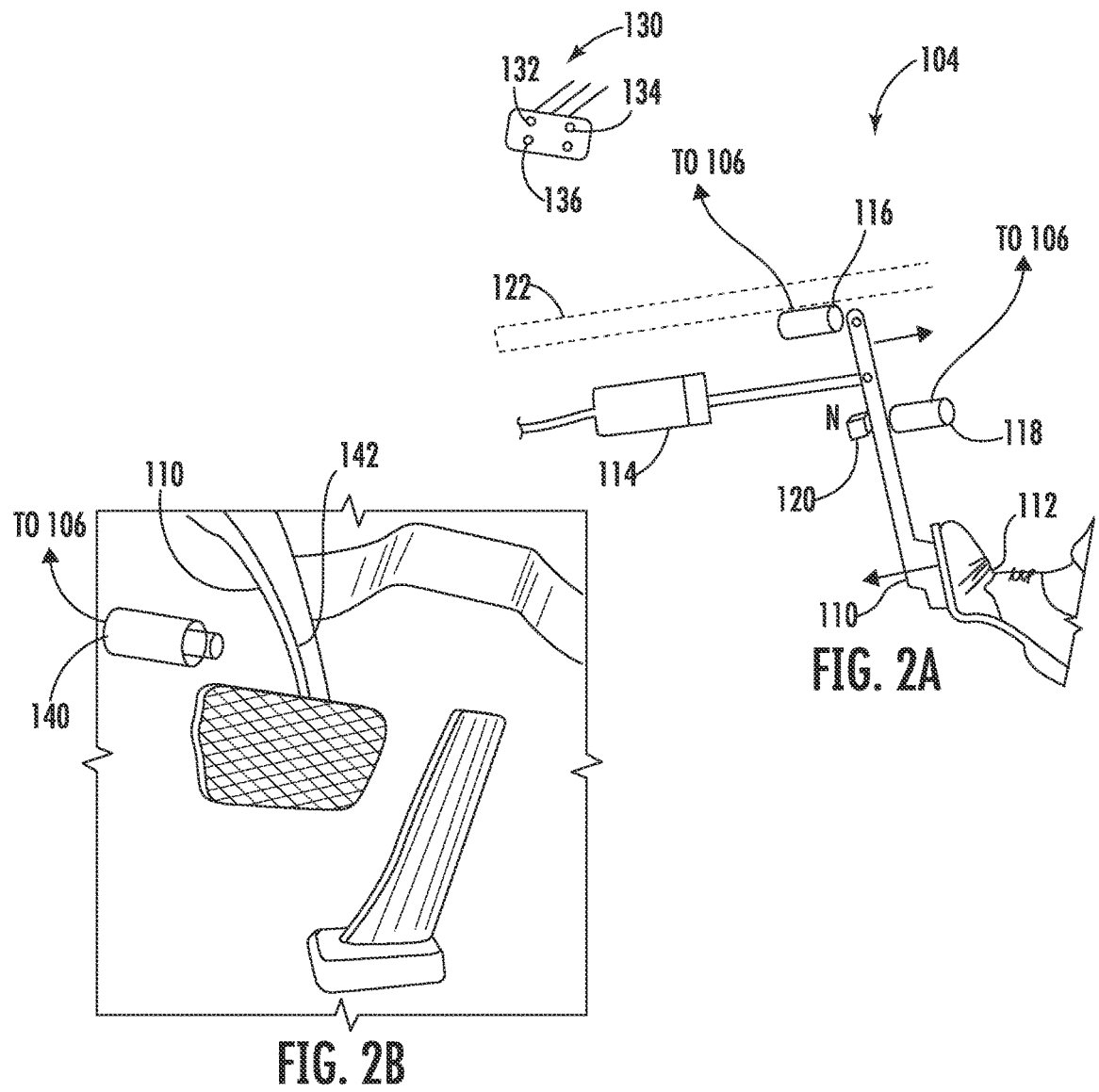
FIG. 2A
FIG. 2B

SYSTEM TO MONITOR AND PREDICT VEHICLE BRAKE WEAR AND RELATED METHODS

RELATED APPLICATION

The present invention is related to U.S. Provisional Patent Application Ser. No. 62/929,247 filed Nov. 1, 2019, the entire contents of which are incorporated herein by reference.

TECHNICAL FIELD

The present invention relates to the field of vehicle maintenance, and, more particularly, to a system to monitor and predict vehicle brake wear and related methods.

BACKGROUND

Vehicles must utilize braking systems to control the speed of a vehicle. Braking may be accomplished by the use of a disc braking system whereby a friction force is applied at one or more wheel assemblies to inhibit wheel rotation. Typically, the driver presses down on a brake pedal to activate the disc brake system. The system generally includes a rotor secured to the vehicle wheel, a caliper assembly mounted to the vehicle chassis, and a pair of brake pads disposed on opposite sides of the rotor. The brake pads squeeze together on the rotor in response to the brake pedal being pressed and apply a braking force to slow the vehicle.

Repeated braking leads to a wearing of the brake pads and reduction in thickness. Once the brake pads are sufficiently worn, they must be replaced or damage to the braking system may occur. Determining how much wear has occurred to the brake pads is typically performed by visual inspection. However, visual inspection of the brake pads is often times not accurate and is difficult to properly view the brake pads during the inspection. Accordingly, there is a need for an improved system to determine the wear of brake pads and when they should be replaced and safety inspections of the vehicle.

However, in view of the prior art at the time the present invention was made, it was not obvious to those of ordinary skill in the pertinent art how the identified needs could be fulfilled.

SUMMARY

In a particular embodiment, a system to monitor and predict vehicle brake wear is disclosed. The system includes a brake sensor configured to be coupled to a brake pedal of a vehicle and to transmit data of the brake pedal operation of when the brake pedal is pressed and a duration thereof. The system also includes an electronic control unit coupled to the brake sensor. The electronic control unit comprises a microprocessor coupled to a memory, where the microprocessor is configured to receive data of the brake pedal operation, and calculate a depth of wear of a brake component based on the brake pedal operation. The brake sensor may comprise a Hall effect sensor or a proximity sensor. In addition, the brake sensor may comprise an electric brake control accessory. The microprocessor may be configured to calculate a pressure (p) applied by the brake pedal as a function of the change of speed over time.

The electronic control unit comprises a global positioning system ("GPS") where the GPS is configured to determine a speed of the vehicle. The electronic control system may also include a Wi-Fi module configured to transmit data from the electronic control unit to a remote computer and/or a cellular module configured to transmit data from the electronic control unit to a remote computer. The electronic control unit may also include an accelerometer and a module configured to transmit data from the electronic control unit to a remote computer.

The remote computer may be configured to receive the data from the electronic control unit and to generate a virtual map. In addition, the system may include a cable configured to connect an OBD2 port of a vehicle to the electronic control unit.

The remote computer may be configured to display a path that the vehicle traveled on the virtual map so that a selected location on the path can be highlighted to obtain data that was generated at a particular time at the selected location.

In another particular aspect, a system to monitor and predict vehicle brake wear is disclosed. The system includes a cable having a first end and a second end. The first end is configured to be coupled to an electric brake control accessory ("EBCA") connector port of a vehicle. The system also includes an electronic control unit coupled to the second end of the cable, where the electronic control unit comprises a microprocessor coupled to a memory. The microprocessor may be configured to receive data of brake pedal operation from the EBCA, and calculate a depth of wear of a brake component based on the brake pedal operation.

In another particular aspect, a system to monitor and predict vehicle brake wear is disclosed. The system includes a vehicle having a brake pedal, a brake sensor coupled to the brake pedal of the vehicle and configured to transmit data of the brake pedal operation of when the brake pedal is pressed and a duration thereof. In addition, the system includes an electronic control unit coupled to the brake sensor, where the electronic control unit comprises a microprocessor coupled to a memory. The microprocessor is configured to receive data of the brake pedal operation, and to calculate a depth of wear of a brake component based on the brake pedal operation.

BRIEF DESCRIPTION OF THE DRAWINGS

FIG. 1 is a school bus installed with a system to monitor and predict vehicle brake wear in which various aspects of the disclosure may be implemented;

FIG. 2A is a schematic of a brake sensing device of the system of FIG. 1;

FIG. 2B is a schematic of laser brake sensing device of the system of FIG. 1;

DETAILED DESCRIPTION

Figure 3:
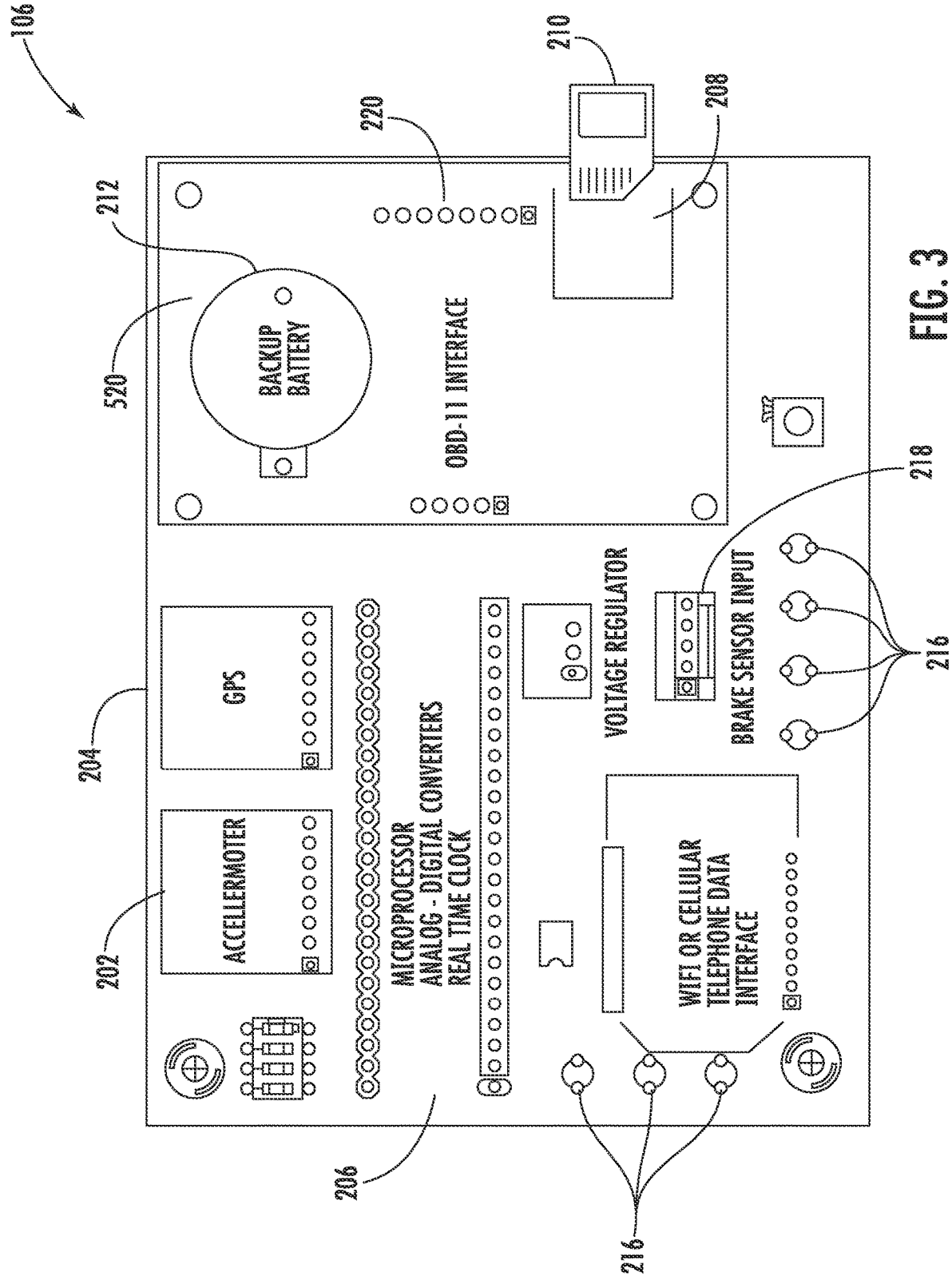
FIG. 3 is a schematic diagram of an electronic control unit ("ECU") of the system of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In a particular aspect, the invention is configured to monitor the activation of vehicle brakes and the amount of usage of the vehicle brakes. The system is also configured to acquire a plurality of safety data and other data that is uniquely triggered by monitoring the activation of the brakes. As a result, the activation of the vehicle brakes is a unique trigger to initiate recording of time, location, speed and other data collected from the vehicle and used by the system. In addition, the system is configured to collect data for safely managing maintenance of fleet vehicles. The system may be configured to collect and store data in a vehicle black box in the event of an accident.

The system is configured to monitor and predict vehicle brake usage and wear using a plurality of data collection devices and methods. For example, the system comprises a plurality of sensors that monitor the operation of the vehicle such as brake usage to collect empirical data. The system is configured to analyze the empirical data from the operation of the vehicle and apply a predictive algorithm for brake wear to that empirical data.

The empirical data may include information about brake usage by a particular driver and that driver's driving habits and behavior. The empirical data may also include information as to a driving condition of the vehicle. The system is configured to compare the empirical data with respect to day and time of the operation of the vehicle.

Referring now to FIG. 1, a schematic of a system to monitor and predict vehicle brake wear of a vehicle is illustrated and generally designated 100. The system 100 is installed in vehicle 102 such as a school bus and includes a brake sensor coupled to an electronic control unit ("ECU") 106 as explained in more detail below. In particular, the system 100 is configured to monitor the life expectancy and predictive wearing of components of vehicle brakes based on the actual operation and driving of the vehicle. For example, monitoring when the brakes are activated by a driver pressing a brake pedal and determining the associated cumulative wear of the brake components as a result. Accordingly, it can be predicted when the brakes should be scheduled for maintenance and replacement without performing a visual inspection.

The brake wear on the vehicle 102 is a result of driving the streets and making numerous stops as passengers are let on and let off in the case of a school or transit bus. In addition, winding roads and hilly terrain usually requires more utilizations of the brakes. A sanitation truck also experiences significant brake wear due to the numerous stops to pick up refuge along the roadway.

Referring now to FIG. 2A, when the brake pedal 110 is pressed by a driver, a brake cylinder 103 of the braking system is activated causing the brake components (e.g. brake shoes and pads) to be applied to the wheels 108 in order to slow the vehicle 102. Each time the brake components are applied to the wheels 108, the life expectancy of the brake components is decreased as the brake components are worn down.

For example, the friction material on a new brake pad is typically about 8-12 millimeters thick, and those that are ready for replacement are worn down to about 3 millimeters.

Accordingly, the system 100 is configured to predict how much wear the brake components have experienced without visually inspecting the brake components themselves. Instead the system 100 uses the driving operation of the vehicle 102 to determine how much wear the brake components have likely experienced and to determine when it is time to replace the brake components.

How much the brake components are worn down each time the brakes are applied is in part a function of the amount of pressure applied to the wheels 108 and the duration the brakes are applied. For example, a light tapping of the brake pedal 110 with little to no pressure that does not slow the vehicle will cause minimal wear of the friction material of the brake pad. In contrast, depressing the brake pedal 110 using higher pressure to quickly slow the vehicle 102 will result in relatively more wearing of the friction material.

The pressure (p) applied by the brake pedal 110 is a function of the change of speed over time and can be expressed as follows: (p)=f(s,t). Accordingly, the greater the change of speed of the vehicle over a shorter period of time will result in a higher pressure in contrast to a smaller change in speed over a greater period of time, for example.

In another particular aspect, a laser measuring device 140 may be used as shown in FIG. 2B to determine the pressure applied by the brake pedal 110. The laser measuring device 140 is mounted so that it emits a laser beam 142 on the brake pedal 110. As the brake pedal 110 is pressed, it moves further away from the laser measuring device 142, which causes the laser measuring device to return an increase in length of the laser beam 142 indicating the brake pedal 110 has been pressed. The greater the length of the laser beam 142, the more pressure applied to the brake pedal 110 and more wearing of the friction material.

The system 100 is configured to calculate a wearing variable (w), which is a function of an amount of the pressure (p) applied to the brake pedal 110 and a material coefficient (µ) of the brake pad material. The wearing variable (w) is multiplied by the duration (t) that the brake pedal 110 is at that pressure (p) to calculate a predictive depth of wear (d) of the brake pad. The material coefficient (µ) is assigned based on a type of material and durability of the brake pad. The depth of wear (d) of the brake pad is cumulative over time. When the depth of wear (d) reaches a predetermined value for replacement (e.g., 3 millimeters) then the system is configured to provide an indicator or warning to the driver.

$$(w)=f(p,\mu)$$

$$(d)=(t)\times(w)$$

Accordingly, when (1−(d)) is calculated to be less than the minimum safe thickness then the brake pad should be replaced.

The rate at which brake components wear, such as the brake pads discussed above as an example, depends on a plurality of variables. Those variables may include the type of brake pads on the vehicle, the metallurgy (hardness and quality) of the castings, how efficiently the rotors cool themselves, the type of driving the vehicle is subjected to, the braking style of the driver (aggressive or easy) and exposure to moisture and road salt, for example.

In a particular aspect, the brake sensor 104 may comprise a proximity sensor 116 or a Hall effect sensor 118 and corresponding magnet 120 mounted to the pedal 110 to determine when the brakes are applied and the duration thereof. In another particular aspect, an electro-mechanical switch can be mounted on the pedal 110 to determine when the brakes are applied and for how long by providing a contact closure when the pedal 110 is pressed. The brake sensor 104 is coupled to the ECU 106 and can be either hard wired or wireless.

As those of ordinary skill in the art can appreciate, there are a plurality of devices and methods that may be used other than those described herein as examples to determine when and how long the brake pedal 100 is pressed and are considered within the scope of this disclosure. For example, an advantage of the Hall effect sensor 118 is that the sensor output can not only give data on whether the brake is pressed but how hard the brake is pressed. This is due to the linear output. The Hall effect sensor 118 uses a twelve volt and a ground that gives an output relative to the distance to a magnetic signal source.

The brake sensor 104 may be mounted to the steering column cover 122 of the vehicle 102 or other similar suitable location. The system 100 is reliable and can be used as a retrofit in order to monitor movement of the brake pedal.

In another particular aspect, an electric brake control accessory ("EBCA") connector 130 is configured to access a point where a brake activation signal can be acquired and serves as the brake sensor 104. There are typically four pins but here pins 132, 134, 136 are used and these pins can have different numbering and location inside the EBCA connector 130. However, for illustrative purposes, pin 132 corresponds to a brake activation signal, pin 134 corresponds to the vehicle chassis ground signal, and pin 136 corresponds to the vehicle battery positive voltage signal. The brake activation signal at pin 132 can replace the brake sensor 104 and the ground and positive voltage (134, 136) can supply the needed power for the ECU 106.

Referring now to FIG. 3, a schematic of the ECU 106 is illustrated. The ECU 106 comprises a plurality of components that work together gathering and processing data. For example, an accelerometer 202 is configured to generate information on the orientation of the vehicle 102. The accelerometer 202 may be configured to generate data on the direction of movement as well as the amount of acceleration and deceleration of the vehicle 102. The accelerometer 202 is configured to detect whether the vehicle 102 is traveling uphill or the vehicle 102 is traveling downhill. The accelerometer 202 may also be configured to detect the vehicle 102 traveling on an uneven road surface. In addition, the accelerometer 202 may be configured to detect a vehicle 102 making an extreme turn so that the forces that are exerted on the vehicle 102 can be accounted for in the predictive analysis of the brake wear.

Figure 6:
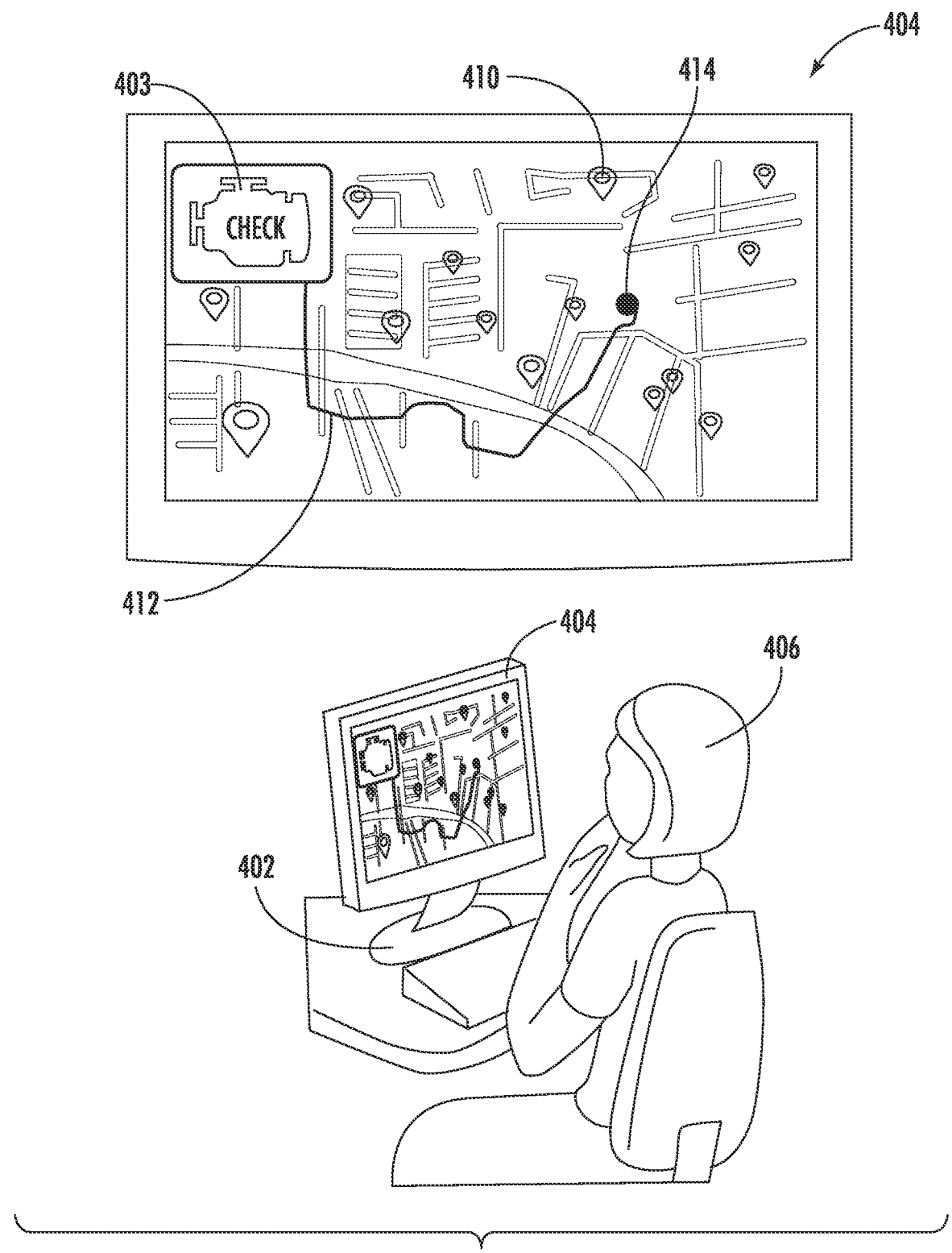
FIG. 6 is a computer in communication with the ECU of FIG. 3 and displaying a virtual map in accordance with an embodiment of the present invention.

The ECU 106 may also include a GPS module 204 that is configured to receive location data and vehicle speed from a satellite that can be displayed on a computer and viewed by an attendant as shown in FIG. 6.

The accelerometer 202 and the GPS module 204 are also configured to provide the speed and acceleration/deceleration of the vehicle 102 over time. This information is used in the predictive analysis of the brake wear discussed above. The ECU 106 may also include a microprocessor 106 coupled to a memory 208 such as a secure digital card slot 210 for data storage and backup. The ECU 106 may include a battery backup 212 to prevent loss of data. The ECU 106 may also have a Wi-Fi, Bluetooth and/or cellular transceiver 214 to provide wireless data communications.

The ECU may include indicator light emitting diodes (LEDs) 216 as onboard status indicators. As discussed above, there is a brake sensor 104 to determine when the brake pedal 110 is pressed and to generate the signal.

Figure 4A:
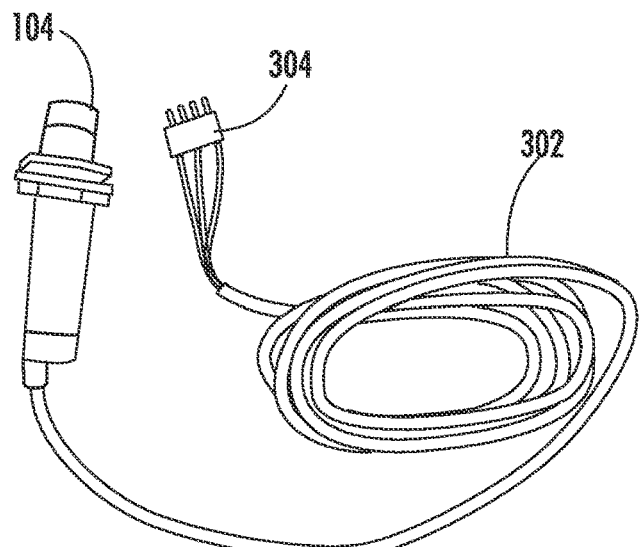
FIG. 4A is a cable to connect a brake sensor for use with the system of FIG. 1.
Figure 4B:
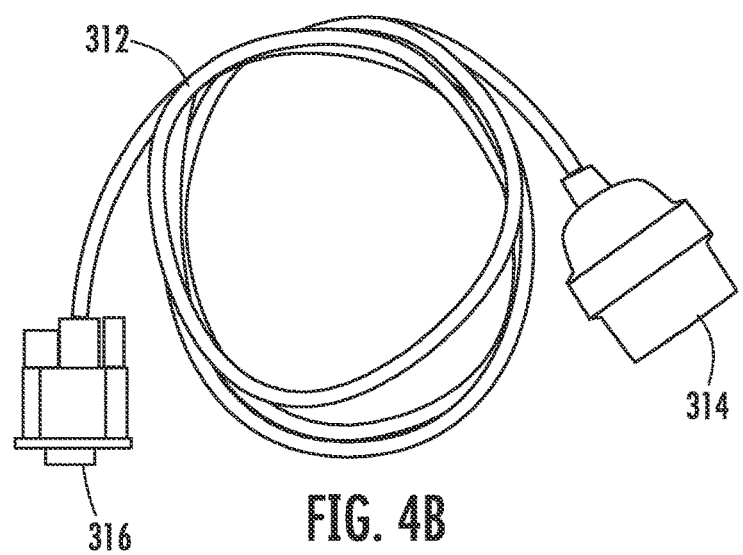
FIG. 4B is a cable to connect to an OBD2 port for use with the system of FIG. 1.

Referring now to FIG. 4A, the brake sensor 104 may be coupled to the ECU by a cable 302. As discussed above, the brake sensor 104 may be a variety of different devices and the cable 302 has a connector 304 that plugs into the ECU 106 at the onboard connector 218. Plug 314 of cable 312 shown in FIG. 4B can be used to connect to an OBD2 port of the vehicle. The nine pin "D" connector 316 of the cable 312 can be plugged into connector 220 on the ECU 106.

Figure 5:
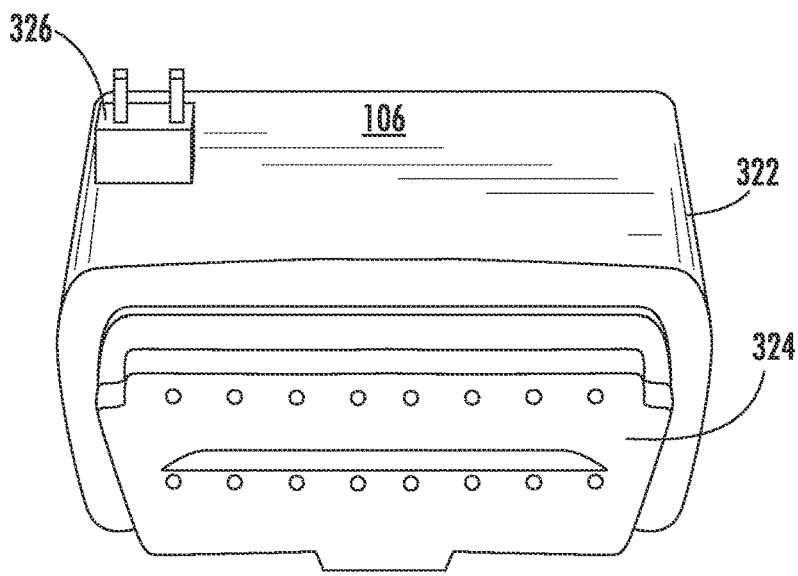
FIG. 5 is a housing for the ECU of FIG. 3.

Referring now to FIG. 5, the ECU 106 may be housed within a case 322 that comprises a connector 324 that is configured to plug directly into the OBD2 port of the vehicle 102 without a cable. The brake sensor may be coupled to port 326 of the case 322 which connects to the ECU 106.

A computer 402 is configured to be in communication with the ECU 106 and to present a virtual map 410 to the attendant 406 on a monitor 404. For example, a warning light 408 may be displayed on the monitor 404 when the minimum brake pad threshold has been exceeded.

The virtual map 410 may be generated for GPS data and can be displayed on the monitor 404. A path 412 that the vehicle 102 traveled has been generated and is displayed on the virtual map 410 as an example. The path 412 and any location on the path 412 can be highlighted to obtain the data that was generated at that time and location.

In a particular aspect, this may include the speed and direction of a vehicle 102. In the event of an accident, the status of the brakes being initiated and the speed at which it took place can be retrieved. For example, location 414 on the virtual map 410 can be highlighted and the data that was generated at that location and at a particular time can be obtained. Each virtual map 410 has paths that are configured to be traced in order to retrieve the data.

In order to install the system 100 in a vehicle 102, the ECU 106 is mounted under the dashboard near the brake and OBD2 port. This can be done with Velcro or screws. The system 100 may be powered from the OBD2 port, but can also use the twelve volts that is available at the fuse block or power that is under the dashboard from the EBCA connector 130.

Next, the brake sensor 104 is installed. This is done by mounting the brake sensor 104 close to the metal brake arm lever as shown in FIG. 2A, or access the EBCA connector 130. If using the EBCA connector, there will be a pin 132 of the EBCA connector 103 that has a voltage representing the brake activation signal. Plug in the connector 304 end into the ECU 106 at onboard 218.

The plug 314 of the OBD2 cable 312 is connected to the OBD2 port of the vehicle 102, which can be found on the driver side of the vehicle 102 under the dashboard. The other end of the OBD2 cable 312 is connected to the ECU 106 by plugging the connector 316 into port 220 of the ECU 106.

As discussed above, the invention is based in part on recording and analyzing the operation of the brakes, vehicle speed, vehicle location, and any abnormal shock to a vehicle 102 when the brakes are activated. In order to determine when the brakes are activated, the brake sensor 104 is used. The brake sensor 104 may comprise a proximity sensor 116 that is configured to monitor how close it is to metal of the brake pedal 110. As an alternative to the proximity sensor 116, an encased Hall sensor 118 may be used to sense the presence of a magnet 120 secured to the brake pedal 110. A mechanical switch may also be used and attached in a manner that detects when the brakes are activated by the brake pedal 110 depressing the switch.

When the brake pedal 110 is activated, the metal moves away from the proximity sensor 116 and generates a brake activation signal. The Hall effect sensor 118 is sensitive to a magnetic field and when the brake pedal 110 is pressed, the Hall effect sensor 107 moves away from the magnet 120 (as shown in FIG. 2A) and generates a brake signal. The electro-mechanical switch can also be configured to generate a brake activation signal. The brake activation signal should be transmitted to the ECU 106 when properly functioning rear brake lights are illuminated. A brake activation signal is an indication that the brake is pressed.

The microprocessor 206 of the ECU 106 receives the information and starts an internal timer. The microprocessor 206 queries the OBD2 port of the vehicle 102 to obtain the vehicle speed at that time. The next task for the microprocessor 206 is to obtain the location of the vehicle 102 from the GPS module 204. The next task is to get the orientation of the vehicle 102 and level of vibration from the accelerometer 202. The microprocessor 206 will constantly monitor the accelerometer 202, the brake activation signal and the GPS module 204 for real-time location. If something happens that is of concern with the travel of the vehicle 102, all the data may be stored on an SD card 210. There is also a backup SD card for redundancy and to ensure that the data is protected.

The memory 208 comprises non-transitory computer readable medium having a plurality of computer executable instructions for causing the microprocessor 206 to perform steps to record and store data, and also to analyze data to predict brake wear as described above. The data may also be transmitted wirelessly to be stored and analyzed remotely from ECU 106.

The following data that may recorded and stored:
 a) every time vehicle brakes are activated;
 b) exact time the vehicle brakes are activated;
 c) length of time the vehicle brakes are activated;
 d) at what speed the vehicle was moving when brakes are activated;
 e) at what speed the vehicle was moving when brakes are released;
 f) did applying the brakes bring the vehicle to a stop;
 g) what is the GPS location of the vehicle when the brakes are activated;
 h) was the vehicle traveling on flat surface, uphill, or downhill when the brakes are activated;
 i) when the brakes are activated, what is the engine or motor RPM; and
 f) a running count on each time the brakes are activated.

The following data may be recorded from the OBD2 port of the vehicle and stored:
 a) vehicle speed;
 b) vehicle engine RPMs;
 c) air temp;
 e) VIN number; and
 f) engine fault codes.

The following data from the GPS module may be recorded and stored:
 a) exact local time of day;
 b) direction of travel;
 c) speed of travel;
 d) location of the vehicle; and
 e) altitude or elevation of the vehicle.

From the accelerometer module, the following data may be recorded and stored:
 a) direction of movement of the vehicle;
 b) acceleration of movement of the vehicle;
 c) deceleration of movement of the vehicle;
 d) angle of travel of the vehicle, uphill, downhill, flat surface; and
 e) altitude or elevation of the vehicle.

The data is referenced to the brakes being activated and is unique to the invention. The brakes being activated marks a time and location for reference to ascertain if the brakes were used at the wrong or right times as well as other needed information about the vehicle.

The above items are collected and stored into memory (e.g. SD cards) at all times and configured to be accessed by the microprocessor 206 for predicting brake wear and maintenance requirements. This data can also be accessed remotely using the Wi-Fi, Bluetooth and/or cellular transceiver 214 and displayed on a remote computer. Warning data can also be displayed on the remote computer. As discussed above, the vehicle 102 can be GPS monitored and locations mapped.

All data can be analyzed to determine the best use for fleet and vehicle owners. The GPS generated map 410 has a traveled path 412, which is helpful to determine whether the vehicle took the most efficient route. A single point can be selected 414 anywhere on that path 412 and all data that was collected can be displayed. If an accident happened at that location, the system 100 is configured to provide all data that was recorded and stored.

The Wi-Fi, Bluetooth, or cellular transceiver 214 is capable of real time updates and transmission of data to the Internet or to an intranet. Also, the data is available on the SD card 210 or other memory device.

Figure 7:
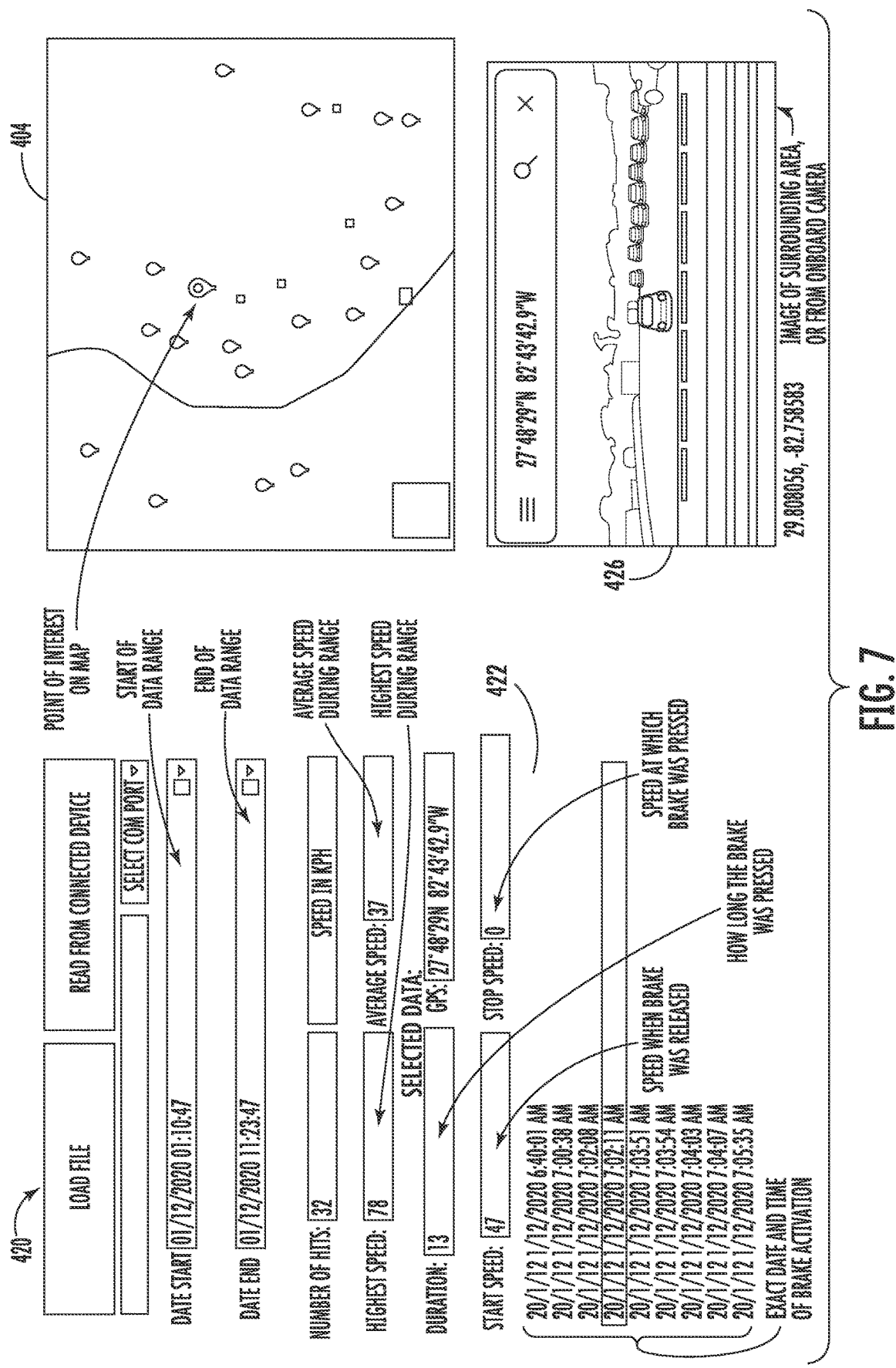
FIG. 7 is a graphical user interface of the system of FIG. 1.

FIG. 7 illustrates a graphical user interface 420 that displays information collected by ECU 106 as to the operation of the vehicle 102. This may include displaying information as to the speed of the vehicle when the brake pedal was pressed 422, or a virtual map 404 as discussed above, or even a video or photograph 426 from a vehicle camera.

An advantage of the system 100 is that it provides a predictive means of brake usage and brake life. Another advantage is that it provides a means of monitoring driving behavior when the system is used for safety and driving efficiency monitoring purposes.

Figure 8:
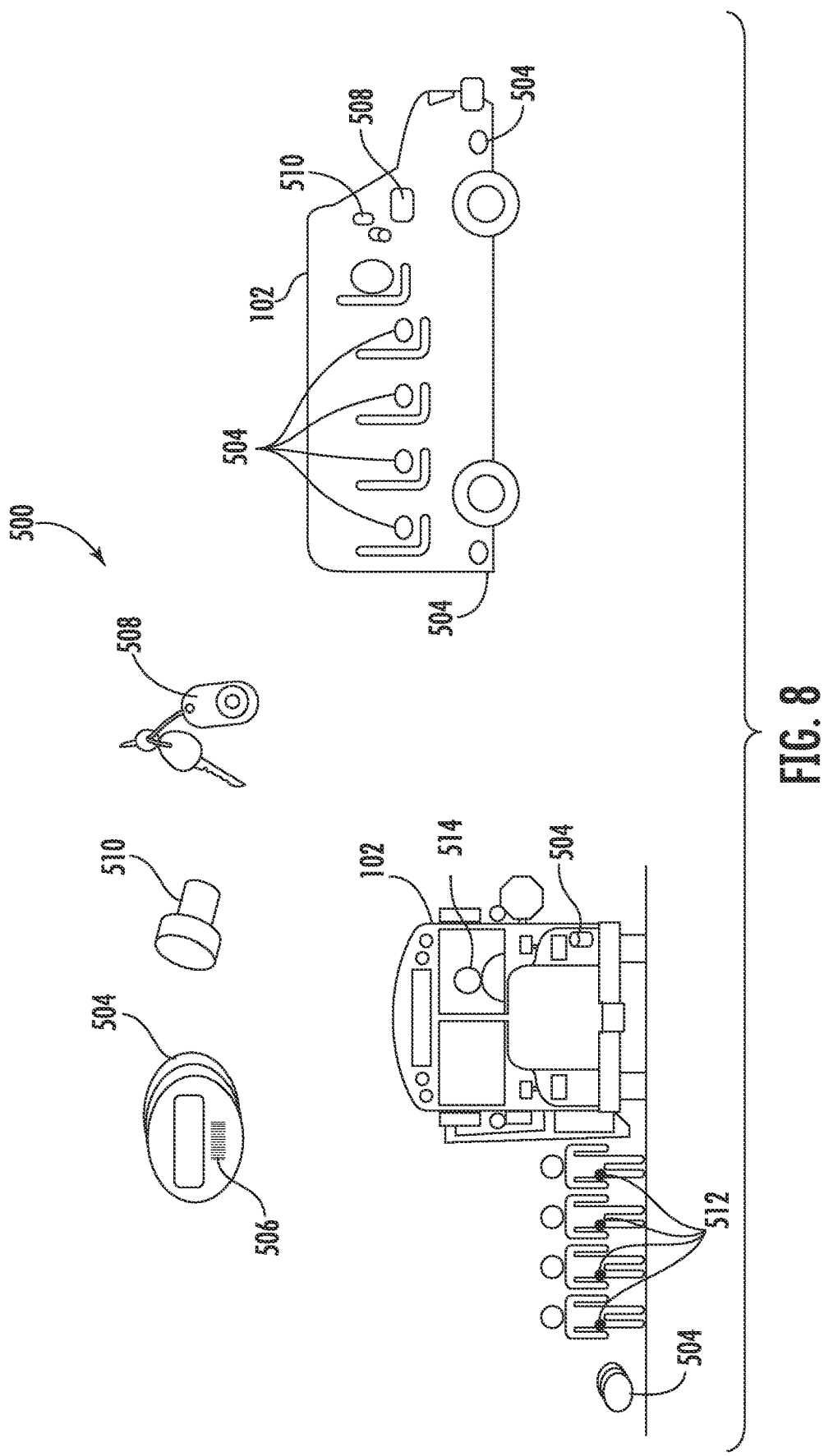
FIG. 8 is a schematic of a safety monitoring system of the system of FIG. 1.

Referring now to FIG. 8, the system 100 may also include a safety monitoring system 500 that may be coupled to the ECU 106. The safety monitoring system 500 is configured to monitor the driver's inspection of the vehicle's safety and vital components such as lights, brake lights, and tires, for example, and to record the times and location of the visual inspections.

In operation, stickers 504 with unique barcodes 506 are placed at strategic location on the vehicle 102 for inspection. For example, in FIG. 8 there is a school bus 102 to transport students 512. A transit bus or any other vehicle may have the safety monitoring system 500 and is not limited to a school bus 102. For example, the safety monitoring system 500 could be installed on fleet vehicles, sanitation trucks, or any other vehicle where there is a need for inspection of the condition of the vehicle and its equipment before the vehicle is put in service on the roadways.

There is a need to make sure the driver 514 or persons responsible for the inspection process completes that process before vehicle usage. One advantage of the safety monitoring system 500 is that it requires an inspection at the areas of interest such as tail lights and head lights. The "engine on" module 510 is configured to detect when the engine is on and whether all the stickers 504 (or which ones) have been scanned indicating a visual inspection of the vehicle 102 was completed. The ECU 106 can also be used to detect when the engine is on without module 510.

The stickers 504 have unique barcodes 506 and are placed in strategic positions on the vehicle 102 so that the driver 514 is required to visually inspect or identify something at that location. Certain equipment like tires should be inspected periodically. Also, there are vehicles that need to have their operational equipment inspected for safety and functionality.

The stickers 504 could also be placed on student armbands, book bags, or backpacks so that each student would be required to be scanned and visually noticed before and after leaving the school bus 102. The unique barcode 506 correlates to what location is being visually inspected. The inspection is completed by the driver 514 scanning the stickers 504 with a barcode scanner 508 and the barcode scanner 508 transmitting that to the ECU 106 to be recorded and stored. The barcode scanner 508 may communicate with the ECU 106 using Wi-Fi, Bluetooth, or cellular transmissions.

The stickers 504 may have adhesive backing to adhere to a flat surface and a printed on barcode 506 that can be read by a barcode scanner 508. The barcode scanner 508 is configured to store and transmit the time, location of the sticker 504 on the vehicle 102 and the location where the vehicle 102 is at the time of the scanning to the ECU 106.

Students 512 loading onto a school bus 102 can have stickers 506 or tags on their back packs and as they board the bus 102 will be scanned by a barcode scanner 508 and entered into the memory of the ECU 106. This includes storing the time and location that a student boarded the bus 102, and if the students are scanned to leave the bus, there is a record of the time and the location that students left the school bus 102. The barcode scanner 508 may be wireless and is configured to communicate with the ECU 106 via wireless communication.

In operation, prior to a bus or any vehicle starting up, the strategically placed stickers 504 near the tires, the headlights, and the tail lights are required to be scanned. This includes a visual inspection of any equipment that is important to be inspected as in a walk around that drivers and pilots do as part of a pre-flight, or pre-travel procedure. This pre-travel inspection ensures reliable monitoring of safety and important equipment.

The barcode scanner 508 may use any type of graphical design as long as each sticker 504 has a unique pattern. The stickers 504 can be QR codes as well as standard barcodes 506. Certain maintenance procedures are required by fleet management, clients, insurance companies as well as government agencies. All scanned data from the visual inspections can be electronically transmitted to the ECU 106 as well as printed out using the safety monitoring system 500.

Many modifications and other embodiments of the invention will come to the mind of one skilled in the art having the benefit of the teachings presented in the foregoing description and the associated drawings. Therefore, it is understood that the invention is not to be limited to the specific embodiments disclosed, and that modifications and embodiments are intended to be included within the scope of the appended claims.

That which is claimed is:

1. A system to monitor and predict vehicle brake wear, the system comprising:
a brake sensor configured to be coupled to a brake pedal of a vehicle and to transmit data of a brake pedal operation of when the brake pedal is pressed and a duration thereof, wherein the brake sensor comprises an electric brake control accessory; and
an electronic control unit coupled to the brake sensor, the electronic control unit comprising a microprocessor coupled to a memory;
wherein the microprocessor configured to perform the following:
receive data of the brake pedal operation,
calculate a depth of wear of a brake component based on the brake pedal operation, and
provide a warning to a driver when the depth of wear reaches a predetermined value for replacement.

2. The system of claim 1, wherein the electronic control unit comprises a global positioning system (GPS) and the GPS is configured to determine a speed of the vehicle.

3. The system of claim 2, wherein the electronic control unit comprises a Wi-Fi module configured to transmit data from the electronic control unit to a remote computer.

4. The system of claim 2, wherein the electronic control unit is configured to transmit data from the electronic control unit to a remote computer.

5. The system of claim 1, wherein the electronic control unit comprises an accelerometer.

6. The system of claim 5, wherein the electronic control unit is configured to transmit data from the electronic control unit to a remote computer.

7. The system of claim 6, further comprising the remote computer configured to receive the data from the electronic control unit and to generate a virtual map.

8. The system of claim 7, further comprising a cable configured to connect an OBD2 port of the vehicle to the electronic control unit.

9. The system of claim 7, wherein the remote computer is configured to display a path that the vehicle traveled on the virtual map so that a selected location on the path can be highlighted to obtain data that was generated at a particular time at the selected location.

10. The system of claim 1, further comprising a safety monitoring system that comprises a plurality of stickers each having a unique barcode thereon to place at a plurality of locations on the vehicle, and a barcode scanner, wherein the unique barcode is configured to be scanned by the barcode scanner indicating a visual inspection of the vehicle was completed at each respective location of the plurality of locations, and wherein the barcode scanner is configured to transmit a status of the visual inspection of the vehicle to the electronic control unit.

11. A system to monitor and predict vehicle brake wear, the system comprising:
a brake sensor configured to be coupled to a brake pedal of a vehicle and to transmit data of a brake pedal operation of when the brake pedal is pressed and a duration thereof, wherein the brake sensor comprises an electric brake control accessory (EBCA);
a cable having a first end and a second end, the first end configured to be coupled to an (EBCA) connector port of the vehicle;
an electronic control unit coupled to the second end of the cable, the electronic control unit comprising a microprocessor coupled to a memory;
wherein the microprocessor is configured to perform the following:
receive data of the brake pedal operation from the EBCA,
calculate a depth of wear of a brake component based on the brake pedal operation; and
provide a warning to a driver when the depth of wear reaches a predetermined value for replacement.

12. The system of claim 11, wherein the electronic control unit comprises a global positioning system (GPS) and the GPS is configured to determine a speed of the vehicle.

13. The system of claim 12, wherein the electronic control unit comprises an accelerometer.

14. The system of claim 13, wherein the electronic control unit is configured to transmit data from the electronic control unit to a remote computer.

15. A system to monitor and predict vehicle brake wear, the system comprising:
- a vehicle having a brake pedal;
- a brake sensor configured coupled to the brake pedal of the vehicle and to transmit data of a brake pedal operation of when the brake pedal is pressed and a duration thereof, wherein the brake sensor comprises an electric brake control accessory; and
- an electronic control unit coupled to the brake sensor, the electronic control unit comprising a microprocessor coupled to a memory;
- wherein the microprocessor is configured to perform the following:
- receive data of the brake pedal operation,
- calculate a depth of wear of a brake component based on the brake pedal operation, and
- provide a warning to a driver when the depth of wear reaches a predetermined value for replacement.

* * * * *